United States Patent
Clarkson et al.

(10) Patent No.: US 6,919,290 B2
(45) Date of Patent: Jul. 19, 2005

(54) CATALYST ACTIVATION PROCESS

(75) Inventors: Jay Simon Clarkson, Stockton-on-Tees (GB); Stephen William Colley, Stockton-on-Tees (GB)

(73) Assignees: BP Exploration Operating Company Limited, London (GB); Davy Process Technology Limited, London (GB)

( * ) Notice: Subject to any disclaimer, the term of this patent is extended or adjusted under 35 U.S.C. 154(b) by 79 days.

(21) Appl. No.: 10/475,263

(22) PCT Filed: Apr. 5, 2002

(86) PCT No.: PCT/GB02/01621

§ 371 (c)(1),
(2), (4) Date: Oct. 20, 2003

(87) PCT Pub. No.: WO02/083817

PCT Pub. Date: Oct. 24, 2002

(65) Prior Publication Data

US 2004/0116277 A1 Jun. 17, 2004

(30) Foreign Application Priority Data

Apr. 5, 2002 (GB) .............................. 0109555

(51) Int. Cl.[7] .......................... B01J 38/10; B01J 20/34; C07C 27/00
(52) U.S. Cl. ......................... 502/53; 518/709
(58) Field of Search ............................ 502/53; 518/709

(56) References Cited

U.S. PATENT DOCUMENTS 4,605,676 A * 8/1986 Kobylinski et al. ......... 518/700
6,100,304 A * 8/2000 Singleton et al. ........... 518/715
6,130,184 A * 10/2000 Geerlings et al. ........... 502/350
6,465,529 B1 * 10/2002 Daage et al. ................ 518/709
6,475,943 B1 * 11/2002 Hoek et al. .................... 502/53
6,486,220 B1 * 11/2002 Wright ........................ 518/709
6,509,382 B1 * 1/2003 Ducreux et al. ............. 518/709
6,537,945 B2 * 3/2003 Singleton et al. ........... 502/327

FOREIGN PATENT DOCUMENTS

| EP | 0590882 A1 | * 9/1993 | ............. C07C/1/04 |
| WO | WO9717137 | * 5/1997 | ............ B01J/37/18 |
| WO | WO 99/61550 | 12/1999 | |

* cited by examiner

*Primary Examiner*—Steven Bos
*Assistant Examiner*—Jonas N. Strickland
(74) *Attorney, Agent, or Firm*—Nixon & Vanderhye

(57) ABSTRACT

A process for activating a cobalt-containing catalyst by contacting the catalyst with hydrogen in a reaction system suitable for use in a Fischer-Tropsch synthesis wherein a first gaseous stream comprising 0.25 to 5% by volume of hydrogen and 95 to 99.75% by volume of inert gas is continuously introduced into the reaction system and a second gaseous stream is continuously withdrawn from the reactor system wherein the activation procedure comprises the steps of: (A) heating the contents of the reactor system to a temperature which is in a range of 25 to 5° C. below a critical activation temperature; (B) thereafter increasing the temperature at a rate of up to 20° C. per hour to a first hold temperature which is in a range of from the critical activation temperature to a temperature which is at most 20° C. above the critical activation temperature; and (C) maintaining the contents of the reactor system approaches the hydrogen content of the first gaseous stream.

30 Claims, 1 Drawing Sheet

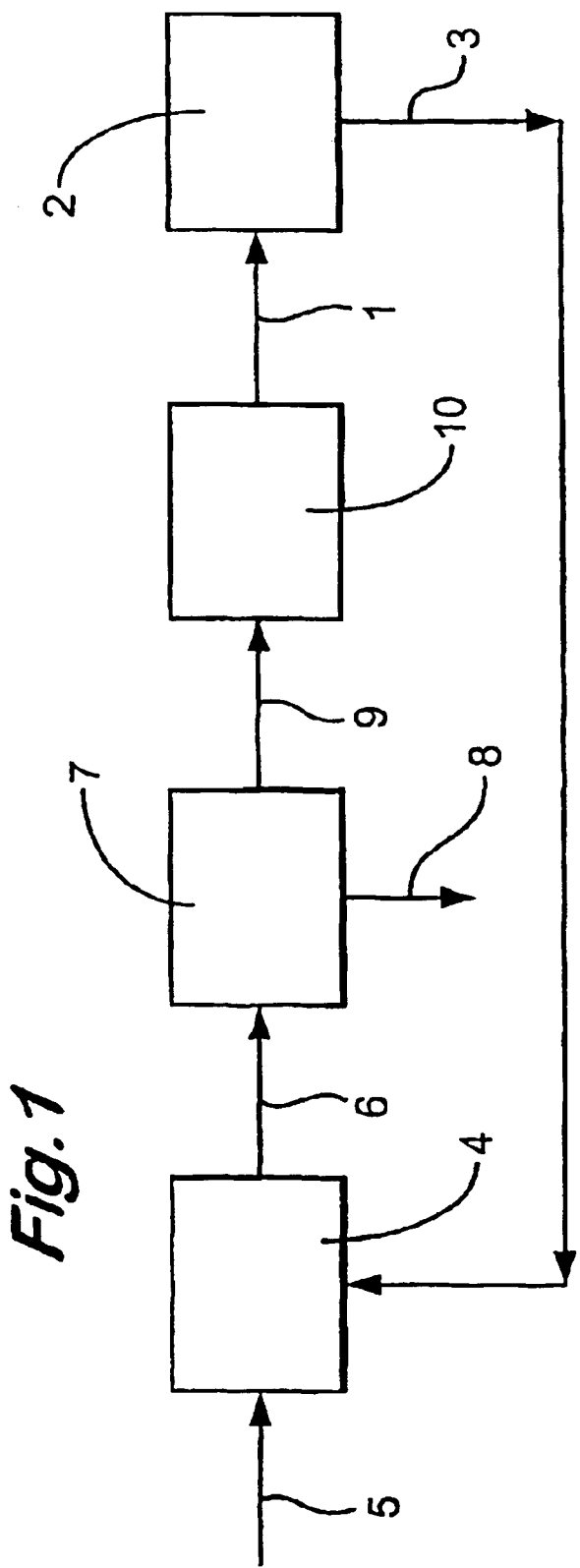

CATALYST ACTIVATION PROCESS

This application is the U.S. National Phase of International Application PCT/GB02/01621, filed 5 Apr. 2002, which designated the U.S.

The present invention relates to an activation treatment for a cobalt-containing Fischer-Tropsch catalyst.

The use of cobalt-containing catalysts in the Fischer-Tropsch process for the conversion of synthesis gas into hydrocarbons is very well known. Various methods of either activating or regenerating a cobalt-containing catalyst by treatment with hydrogen have been proposed.

Thus, U.S. Pat. No. 4,729,981 describes subjecting a supported cobalt catalyst to an activation procedure comprising the steps, in sequence, of (A) reduction in hydrogen, (B) oxidation in an oxygen-containing gas, and (C) reduction in hydrogen, the activation procedure being conducted at a temperature below 500° C., preferably below 450° C. Temperature ranges of 100° or 150° to 450° C., preferably 250° to 400° C. are suitable for the reduction and oxidation steps. The activation steps are conducted while heating at a rate of from about 0.1° to about 5° C., preferably from about 0.1° to about 2° C. per minute.

European patent application EP-A-0168894 relates to a process for the activation of a catalyst, in which a catalyst comprising 3–60 pbw of cobalt and 0.1–100 pbw of at least one other metal chosen from zirconium, titanium, and chromium per 100 bpw of silica, alumina or silica-alumina, which catalyst has been prepared by kneading and/or impregnation, is contacted at a temperature between 200 and 350° C. and a hydrogen partial pressure between 0.001 and 75 bar with hydrogen or a hydrogen-containing gas, and in which during the activation the hydrogen partial pressure is increased gradually or step-wise from an initial value $(pH_2)i$ to an ultimate value $(pH_2)u$ in such a manner as to satisfy the relation $(pH_2)u \geq 5 \times (pH_2)i$. U.S. Pat. No. 5,168,091, relates to activating cobalt containing hydrocarbon synthesis catalysts. The hydrocarbon synthesis catalyst is activated by reduction, which is carried out with hydrogen or a hydrogen containing gas. The gas may be diluted with an inert such as nitrogen, helium, or argon. The final temperature of the reduction is said to have a significant effect on the ultimate hydrocarbon synthesis activity of the catalyst. In a preferred embodiment, substantially complete reduction is effected at temperatures below about 550° C., preferably from about 275° C. to about 425° C., and most preferably, for maximizing catalyst activity, reduction is effected at temperatures ranging from 315° C. to about 375° C.

WO 99/61550 provides a cobalt catalyst for hydrocarbon synthesis, wherein the cobalt catalyst comprises cobalt supported on a γ-alumina support. The cobalt catalyst is not promoted with any noble metals and is not promoted with any near noble metals. However, the cobalt catalyst has been reduced in the presence of hydrogen at a water vapor partial pressure effective to increase the activity of the cobalt catalyst for hydrocarbon synthesis. The water vapor partial pressure is preferably in the range of from 0 to 0.1 atmospheres. To provide optimum performance, the catalyst is activated by reducing the catalyst in a hydrogen-containing gas by slowly increasing the temperature of the catalyst, preferably at a rate of about 0.5–2° C./minute, to approximately 250–400° C. (preferably about 350° C.) and holding at the desired temperature for at least 2 hours.

Preferred activation temperatures for Fischer Tropsch catalysts lie above the normal operating temperatures of a Fischer Tropsch reaction. Accordingly, where a Fischer Tropsch catalyst is activated in situ in a Fischer Tropsch reactor, the reactor must be designed to tolerate the more extreme conditions of the activation step. It would therefore be advantageous to provide an effective activation procedure for a cobalt-containing Fischer Tropsch where the activation conditions are within the normal operating parameters for a Fischer Tropsch reaction.

Thus, according to the present invention there is provided a process for activating a cobalt-containing catalyst by contacting the catalyst with hydrogen in a reactor system suitable for use in a Fischer-Tropsch synthesis wherein a first gaseous stream comprising 0.25 to 5% by volume of hydrogen and 95 to 99.75% by volume of inert gas is continuously introduced into the reactor system and a second gaseous stream is continuously withdrawn from the reactor system wherein the activation procedure comprises the steps of: (A) heating the contents of the reactor system to a temperature which is in a range of 25 to 5° C. below a critical activation temperature; (B) thereafter increasing the temperature at a rate of up to 20° C. per hour to a first hold temperature which is in a range of from the critical activation temperature to a temperature which is at most 20° C. above the critical activation temperature; and (C) maintaining the contents of the reactor system at the first hold temperature until the hydrogen content of the second gaseous stream approaches the hydrogen content of the first gaseous stream.

An advantage of the catalyst activation procedure of the present invention is that the critical activation temperature of the catalyst lies well within the normal operating conditions of a Fischer Tropsch (FT) reactor system. This allows the catalyst to be activated in situ in an FT reactor system, designed to withstand the normal operating temperatures of an FT synthesis reaction but not the more extreme conditions of a conventional FT catalyst activation procedure; Also, reductive activation of a supported cobalt catalyst is an exothermic process which necessitates the removal of heat from the reactor system in order to maintain the contents of the reactor system at the desired hold temperature for step (C). The Fischer Tropsch process is also exothermic such that commercial FT reactor systems are provided with heat exchangers for removal of the heat of reaction. Thus, a further advantage of activating the catalyst in situ in an FT reactor system is that the first hold temperature can be maintained using the cooling system of the FT reactor system. Accordingly, the investment cost of a commercial plant can be considerably reduced by activating the catalyst in situ within the FT reactor system.

The critical activation temperature is defined herein as the temperature at which the rate of reduction of the catalyst increases sharply, as evidenced by a substantial reduction in the hydrogen content of the second gaseous stream (which is withdrawn from the reactor system) when compared with the hydrogen content of the first gaseous stream (which is introduced to the reactor system). Typically, the hydrogen content of the second gaseous stream falls to less than 90%, preferably less than 80% of the hydrogen content of the first gaseous stream when the critical activation temperature is reached. Typically, the critical activation temperature of the catalyst is in the range 210 to 260° C., preferably 220 to 250° C.

The extent of reduction of the catalyst is determined by either continuously or intermittently analyzing the hydrogen content of the second gaseous stream and comparing its hydrogen content to that of the first gaseous stream. Preferably, during the initial period of the reduction at the first hold temperature, the hydrogen content of the second gaseous stream is less than 90%, most preferably less than 80% of the hydrogen content of the first gaseous stream. When reduction of the catalyst is substantially complete at the first bold temperature the hydrogen content of the second gaseous stream will approach that of the first gaseous stream. Preferably, the reduction of the catalyst is continued at the first hold temperature until the hydrogen content of the second gaseous stream is substantially the same as that of the first gaseous stream. By substantially the same is meant that the hydrogen content of the second gaseous stream is at least 90%, preferably at least 95%, for example at least 98% of the hydrogen content of the first gaseous stream.

Typically, in step (A) the contents of the reactor system are heated to a temperature which is in the range of 25 to 5° C. below, preferably 15 to 7.5° C. below, more preferably 12 to 9° C. below the critical activation temperature of the catalyst.

Preferably, prior to step (A), air is purged from the reactor system by continuously feeding into the reactor system an inert gaseous stream comprising an inert gas selected from nitrogen, helium and argon and less than 0.2% by volume of oxygen and continuously withdrawing from the reactor system a purge stream until the oxygen content of the purge stream is less than 0.5% by volume. Preferably, this purging step is carried out at ambient temperature. Hydrogen is then introduced into the inert gaseous stream in an amount of 0.25 to 5% by volume, preferably 0.5 to 1.5% by volume in order to generate the first gaseous stream.

Preferably, in step (A), the contents of the reactor system are heated at a rate of up to 4° C./minute, preferably up to 2° C./minute, until the temperature is in a range of from 25 to 5° C. below the critical activation temperature.

Typically, step (C) is carried out at a hold temperature which is at most 20° C. above, preferably at most 15° C., more preferably at most 10° C. above, for example at most 5° C. above the critical activation temperature.

Preferably, in step (B), the temperature is ramped to the first hold temperature at a rate of up to 10° C. per hour, more preferably at a rate of up to 5° C. per hour, most preferably at a rate of up to 3° C. per hour, for example, at a rate of up to 2° C. per hour.

Typically, the catalyst is maintained at the first hold temperature of step (C) for 12 to 120 hours, preferably 24 to 72 hours.

Optionally, the activation procedure has a further step (D) of heating the contents of the reactor system at a rate of up to 20° C. per hour from the first hold temperature to a second hold temperature which may be up to the maximum operating temperature of a Fischer Tropsch reaction. Preferably, in step (D) the temperature is ramped to the second hold temperature at a rate of up to 10° C. per hour, more preferably a rate of up to 5° C. per hour, most preferably a rate of up to 3° C. per hour, for example, a rate of up to 2° C. per hour. Typically, in step (D) the second hold temperature may be up to 260° C., more preferably up to 250° C. and most preferably up to 240° C. Suitably, the contents of the reactor system are maintained at the second hold temperature until the hydrogen content of the first gaseous stream is substantially the same as the hydrogen content of the second gaseous stream. Typically, the contents of the reactor system are maintained at the second hold temperature for a period of 0.5 to 48 hours, preferably 4 to 8 hours. Without wishing to be bound by any theory, the majority of the catalyst activation occurs in step (C) with only a minor amount of activation occurring at the more extreme conditions of optional step (D).

The first gaseous stream comprises 0.25 to 5% by volume of hydrogen and 95 to 99.75% by volume of inert gas, preferably 0.5 to 1.5% by volume of hydrogen and 98.5 to 99.5% by volume of inert gas, for example 1% by volume of hydrogen and 99% by volume of inert gas. Suitably, the inert gas is selected from the group consisting of nitrogen, helium and argon, preferably, nitrogen.

The hydrogen content of the second gaseous stream is monitored relative to the content of the inert gas. Where the hydrogen content of the second gaseous stream is monitored intermittently, the time interval between the analyses is preferably, less than 1 hour, more preferably, less than 0.5 hour, most preferably less than 15 minutes, for example less than 10 minutes. Preferably, in step (B) the hydrogen content of the second gaseous stream is monitored at time intervals which allow the critical activation temperature to be accurately determined. For example, where the temperature is increased in step (B) at a rate of 20° C. per hour, the hydrogen content of the second gaseous stream should preferably be monitored at time intervals of less than 15 minutes, more preferably, less than 10 minutes. The hydrogen content of the second gaseous stream may also be monitored continuously. Preferably, step (C) and optional step (D) are continued until the hydrogen content of the second gaseous stream is identical to the hydrogen content of the first gaseous stream within the accuracy of the measuring instrument, which is preferably better than +/−0.1% hydrogen by volume in the total gaseous stream. Suitably, the hydrogen content of the second gaseous stream may be analyzed by gas chromatography or mass spectrometry.

Preferably, the first gaseous stream is introduced into the reactor system at a flow rate such that the gas hourly space velocity (hereinafter GHSV) is 200–800, more preferably 300–500, for example 400 at normal temperature and pressure (hereinafter "NTP"; i.e. 0° C. and 1 atmosphere pressure).

Preferably, at least a portion of the second gaseous stream is recycled to the reactor system to form at least part of the first gaseous stream. Where necessary, make-up hydrogen is introduced to the gaseous recycle stream so as to maintain the hydrogen content of the first gaseous stream. Preferably, the gaseous recycle stream is cooled before being recycled to the reactor system, for example, by passing the stream through a heat exchanger, in order to assist in the removal of the exothermic heat of reaction from the reactor system. Preferably, the gaseous recycle stream is cooled to below its dew point, which has an advantage that water (a by-product of the reductive activation procedure) condenses out of the gaseous recycle stream and is preferably removed from the system using a suitable gas-liquid separation means, for example, the heat exchanger may be provided with a water trap. Preferably, the gaseous recycle stream is cooled to a temperature below 60° C., more preferably below 40° C. Make-up hydrogen may be fed to the gaseous recycle stream, either upstream or downstream of the heat exchanger. Where the make-up hydrogen has not been pre-cooled, it is preferred that the make-up hydrogen is fed to the gaseous recycle stream upstream of the heat exchanger.

Suitably, the process of the present invention is carried out at a relatively low pressure, preferably at a pressure of less than 20 bar absolute, more preferably less than 10 bar absolute, most preferably at a pressure in the range 2 to 5 bar absolute.

The process of the present invention can be used to activate a fresh cobalt-containing catalyst, or it can be used as part of a regeneration sequence for a cobalt-containing catalyst which has already been used in an Fr reaction.

The cobalt-containing catalyst used in the present invention preferably comprises cobalt on a support. Very many suitable supports may be used, for example, elemental carbon (for example, graphite), silica, alumina, titania, ceria, zirconia or zinc oxide. The support may itself have some catalytic activity. Preferably, the catalyst contains from 2 to 35% w, especially from 5 to 25% w of cobalt. Alternatively, the cobalt catalyst may be used without a support. In this case, the catalyst is often prepared in the form of cobalt oxide. Active metal components or promoters may be present as well as cobalt if desired. Suitable active metal components or promoters include, but are not limited to, zirconium, titanium, ruthenium, and chromium.

The cobalt-containing catalyst may be pre-treated at elevated temperature with a gas containing an inert gas and molecular oxygen, such as air. Preferably, this pre-treatment is carried out before the catalyst is introduced to the FT reactor system.

The catalyst may be used in the form of a fluidized bed in which case the first gaseous stream is introduced into the reactor system at a flow rate which sustains fluidization of the bed without entrainment of the catalyst out of the bed.

Alternatively, the catalyst may be suspended in a liquid medium, for example, in a slurry bubble column, in which case, the first gaseous stream is introduced into the reactor system at a flow rate which is sufficiently high to maintain the catalyst in suspension in the liquid medium.

The catalyst may also be suspended in a liquid medium and the suspension is passed through a high shear mixing zone where the slurry is mixed with the first gaseous stream and then the combined stream enters a post mixing zone (as described in WO 0138269 (PCT patent application number GB 0004444) which is herein incorporated by reference).

The invention will now be illustrated with the aid of the following FIGURE and Examples.

The FIGURE is a flow diagram representing a process according to the invention. In the FIGURE a first gaseous stream (1) comprising hydrogen and nitrogen is fed to an FT reactor (2) which is heated via an externally generated steam flow (not shown). A second gaseous stream (3) comprising nitrogen, unreacted hydrogen and water vapour by-product is withdrawn from the FT reactor (2) and is recycled to a gas compressor (4). Make-up hydrogen (5) is mixed with the second gaseous stream (3) at or before the inlet to the compressor (4). A compressed gaseous stream (6) which exits the compressor (4) is delivered to a heat exchanger (7) wherein the gaseous stream (6) is cooled to a temperature below 60° C., so that the water vapour condenses and separates from the gaseous stream (6). A stream of condensed water (8) is removed from the heat exchanger (6) while a dried gaseous stream (9) comprising hydrogen and nitrogen is directed to a pressure let down system (10) wherein the pressure of the first gaseous stream (1) exiting the pressure let down system (10) is controlled to give the desired gas flow rate through the FT reactor (2).

COMPARATIVE EXAMPLE 1

A 10 g sample of a fixed bed cobalt catalyst comprising 10% by weight cobalt on a zinc oxide support and occupying a total bed volume of 14 ml, was activated in a tubular fixed bed FT reactor by passing a stream of pure hydrogen through the bed at atmospheric pressure and a temperature of 275° C. for a period of 8 hours. This activation temperature lies above the normal maximum operating temperature of a FT reactor.

The gas feed was then switched to synthesis gas. After 2000 hours operation with a synthesis gas feed containing a 1.9:1$H_2$:CO ratio at a total pressure of 30 bar absolute, the productivity of $C_5^+$ hydrocarbons was 105 g/l/h at a feed rate of 1250 GHSV at NTP.

EXAMPLE 1

A 10 ml sample of a cobalt catalyst comprising 10% by weight cobalt on a zinc oxide support and occupying a total bed volume of 14 ml, was activated in a tubular fixed bed FT reactor by continuously introducing fresh gaseous feed consisting of 1% hydrogen in nitrogen through the catalyst bed at a GHSV of 1250.

The temperature of the catalyst bed was raised to a temperature of 220° C. and then the temperature was increased at a rate of 3° C. per hour until the hydrogen content of the gaseous stream exiting the reactor was less than 0.9% volume. This occurred at a temperature of 232° C. (critical activation temperature). The hydrogen content of the gaseous stream exiting the reactor was observed to continue to decline at this temperature. The temperature was then maintained constant at 232° C. (first hold temperature) until the hydrogen content of the exit gas rose to above 0.9% volume which occurred after 12 hours. The temperature of the catalyst bed was then allowed to rise to the maximum operating temperature the equipment was designed for, in this instance 240° C. The temperature of the catalyst bed was maintained at this maximum operating temperature (second hold temperature) for a further 6 hours whilst continuing to feed fresh gaseous feed through the catalyst bed.

The gas feed was then switched to synthesis gas. After 2000 hours operation with a synthesis gas feed containing a 1.9:1$H_2$:CO ratio at a total pressure of 30 bar absolute, the productivity of $C_5^+$ hydrocarbons was 108 g/l/h at a feed rate of 1250 GHSV at NTP.

Example 1 shows that an equivalent catalyst activity to Comparative Example 1 has been achieved by the process of the invention at an activation temperature below the maximum operating temperature for a typical commercial FT process.

EXAMPLE 2

A 1.6 liter charge of the catalyst used in Example 1 was loaded into a commercial tubular fixed bed FT reactor. Pressure drop considerations through the catalyst bed restricted the gas flow rate to a GHSV of 800. A gaseous stream consisting of 1% hydrogen in nitrogen (first gaseous stream) was passed through the catalyst bed at this flow rate at ambient temperature. The temperature was then increased at a rate 2° C./minute to a temperature of 220° C. and then at a rate of 2° C./hour until the hydrogen content of the gaseous stream exiting the reactor (second gaseous stream) was less than 0.9% volume. This occurred at a temperature of 229° C. (critical activation temperature). The lower critical activation temperature in comparison to Example 1 was a result of the different reactor geometry and reactor inlet pressure. The temperature was then maintained constant at 229° C. (first hold temperature) until the hydrogen content of the second gaseous stream rose to above 0.9% volume. This occurred after about 20 hours. The temperature of the catalyst bed was then allowed to rise to the maximum operating temperature the equipment was designed to tolerate, in this instance 235° C. (second hold temperature). The catalyst bed was maintained at the second hold temperature for a further 4 hours whilst continuing to feed the first gaseous stream through the bed; the reactor was then allowed to cool under flow of nitrogen gas. The reactor was then maintained under nitrogen at ambient conditions until plant operation was ready to commence.

The gas feed was switched to synthesis gas. After 2000 hours operation with a synthesis gas feed containing a 1.9:1 $H_2$:CO ratio at a total pressure of 30 bar absolute, the productivity of $C_5^+$ hydrocarbons was 115 g/l/h at a feed rate of 1250 GHSV at NTP.

What is claimed is:

1. A process for activating a cobalt-containing catalyst by contacting the catalyst with hydrogen in a reactor system suitable for use in a Fischer-Tropsch synthesis wherein a first gaseous stream comprising 0.25 to 5% by volume of hydrogen and 95 to 99.75% by volume of inert gas is continuously introduced into the reactor system and a second gaseous stream is continuously withdrawn from the reactor system wherein the activation procedure comprises the steps of:
   (A) heating the contents of the reactor system to a temperature which is in a range of 25 to 5° C. below a critical activation temperature;
   (B) thereafter increasing the temperature at a rate of up to 20° C. per hour to a first hold temperature which is in a range of from the critical activation temperature to a temperature which is at most 20° C. above the critical activation temperature; and
   (C) maintaining the contents of the reactor system at the first hold temperature until the hydrogen content of the second gaseous stream approaches the hydrogen content of the first gaseous stream.

2. A process as claimed in claim 1 wherein the critical activation temperature of the catalyst is in the range 210 to 260° C., preferably 220 to 250° C.

3. A process as claimed in claim 1 wherein the hydrogen content of the second gaseous stream is determined either continuously or intermittently and is compared with the hydrogen content of the first gaseous stream.

4. A process as claimed in claim 3 wherein the critical activation temperature is the temperature at which the hydrogen content of the second gaseous stream falls to less than 90%, preferably less than 80% of the hydrogen content of the first gaseous stream.

5. A process as claimed in claim 3 wherein the reduction of the catalyst is continued at the first hold temperature until the hydrogen content of the second gaseous stream is at least 95%, preferably at least 98% of the hydrogen content of the first gaseous stream.

6. A process as claimed in claim 3 wherein the hydrogen content of the second gaseous stream is monitored intermittently with a time interval between the analyses of less than 15 minutes, preferably less than 10 minutes.

7. A process as claimed in claim 1 wherein the contents of the reactor system are heated in step (A) to a temperature which is in the range of 25 to 5° C. below, preferably 15 to 7.5° C. below the critical activation temperature of the catalyst.

8. A process as claimed in claim 1 wherein air is purged from the reactor system prior to step (A) by continuously feeding into the reactor system an inert gaseous stream comprising an inert gas selected from the group consisting of nitrogen, helium and argon containing less than 0.2% by volume of oxygen and continuously withdrawing from the reactor system a purge stream until the oxygen content of the purge stream is less than 0.5% by volume.

9. A process as claimed in claim 1 wherein the contents of the reactor system are heated in step (A) at a rate of up to 4° C./minute, preferably up to 2° C./minute, until the temperature is in a range of from 25 to 5° C. below the critical activation temperature.

10. A process as claimed in claim 1 wherein step (C) is carried out at a hold temperature which is at most 20° C. above, preferably at most 10° C. above the critical activation temperature.

11. A process as claimed in claim 1 wherein, in step (B), the temperature is ramped to the first hold temperature at a rate of up to 10° C. per hour, more preferably at a rate of up to 3° C. per hour.

12. A process as claimed in claim 1 wherein the catalyst is maintained at the first hold temperature of step (C) for 12 to 120 hours, preferably 24 to 72 hours.

13. A process as claimed in claim 1 wherein in a further step (D), the contents of the reactor system are heated at a rate of up to 20° C. per hour from the first hold temperature to a second hold temperature which is up to the maximum operating temperature of the reactor system.

14. A process as claimed in claim 13 wherein the temperature is ramped to the second hold temperature at a rate of up to 10° C. per hour, more preferably a rate of up to up to 3° C. per hour.

15. A process as claimed in claim 13 wherein the second hold temperature of step
   (D) is a temperature of up to 260° C., preferably a temperature of up to 240° C.

16. A process as claimed in claim 13 wherein the contents of the reactor system are maintained at the second hold temperature until the hydrogen content of the first gaseous stream is substantially the same as the hydrogen content of the second gaseous stream.

17. A process as claimed in claim 16 wherein the catalyst is maintained at the second hold temperature for a period of 0.5 to 48 hours, preferably 4 to 8 hours.

18. A process as claimed in claim 1 wherein the first gaseous stream comprises 0.5 to 1.5% by volume of hydrogen and 98.5 to 99.5% by volume of inert gas, preferably 1% by volume of hydrogen and 99% by volume of inert gas.

19. A process as claimed in claim 1 wherein the first gaseous stream comprises an inert gas selected from the group consisting of nitrogen, helium and argon.

20. A process as claimed in claim 1 wherein the hydrogen content of the second gaseous stream is analyzed by gas chromatography or mass spectrometry.

21. A process as claimed in claim 1 wherein the first gaseous stream is introduced into the reactor system at a flow rate such that the gas hourly space velocity is in the range 200 to 800, preferably 300 to 500 at normal temperature and pressure.

22. A process as claimed in claim 1 wherein at least a portion of the second gaseous stream is recycled to the reactor system to form at least part of the first gaseous stream and make-up hydrogen is introduced to the gaseous recycle stream so as to maintain the hydrogen content of the first gaseous stream at a substantially constant value.

23. A process as claimed in claim 22 wherein the gaseous recycle stream is cooled to below its dew point before being recycled to the reactor system, and condensed water is removed from the gaseous recycle stream by means of a gas liquid separator.

24. A process as claimed in claim 1 wherein the process is carried out at a pressure of less than 20 bar absolute, preferably at a pressure in the range 2 to 5 bar absolute.

25. A process as claimed in claim 1 wherein the cobalt-containing catalyst comprises cobalt on a support selected from the group consisting of elemental carbon, silica, alumina, titania, ceria, zirconia and zinc oxide.

26. A process as claimed in claim 25 wherein the catalyst contains from 2 to 35% w, especially from 5 to 25% w of cobalt.

27. A process as claimed in claim 25 wherein the catalyst comprises a promoter selected from the group consisting of zirconium, titanium, ruthenium, and chromium.

28. A process as claimed in claim 1 wherein the cobalt-containing catalyst is pre-treated at elevated temperature with a gas comprising an inert gas and molecular oxygen, before being introduced to the reactor system.

29. A process as claimed in claim 1 wherein the catalyst is used in the form of a fluidized bed and the first gaseous stream is introduced into the reactor system at a flow rate which sustains fluidization of the bed without entrainment of the catalyst out of the bed.

30. A process as claimed in claim 1 wherein the catalyst is suspended in a liquid medium and the first gaseous stream is introduced into the reactor system at a flow rate which is sufficiently high to maintain the catalyst in suspension in the liquid medium.

* * * * *